US011208359B2

(12) United States Patent
Iida et al.

(10) Patent No.: US 11,208,359 B2
(45) Date of Patent: Dec. 28, 2021

(54) CORROSION-RESISTANT MEMBER

(71) Applicant: KYOCERA Corporation, Kyoto (JP)

(72) Inventors: Shuichi Iida, Kirishima (JP); Mizuho Oota, Kirishima (JP); Satoshi Toyoda, Kirishima (JP); Hidehiro Takenoshita, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 143 days.

(21) Appl. No.: 16/489,015

(22) PCT Filed: Feb. 23, 2018

(86) PCT No.: PCT/JP2018/006736
§ 371 (c)(1),
(2) Date: Sep. 27, 2019

(87) PCT Pub. No.: WO2018/155637
PCT Pub. Date: Aug. 30, 2018

(65) Prior Publication Data
US 2020/0031726 A1   Jan. 30, 2020

(30) Foreign Application Priority Data
Feb. 27, 2017   (JP) ............... JP2017-035008

(51) Int. Cl.
*C04B 41/87* (2006.01)
*C04B 35/111* (2006.01)
*C04B 41/45* (2006.01)
*B67D 3/00* (2006.01)
*C04B 35/10* (2006.01)
*C04B 35/626* (2006.01)
*C04B 35/64* (2006.01)
*C04B 41/00* (2006.01)
*C04B 41/50* (2006.01)

(52) U.S. Cl.
CPC ........ *C04B 41/4556* (2013.01); *B67D 3/0058* (2013.01); *C04B 35/10* (2013.01); *C04B 35/62655* (2013.01); *C04B 35/62695* (2013.01); *C04B 35/64* (2013.01); *C04B 41/009* (2013.01); *C04B 41/4517* (2013.01); *C04B 41/5057* (2013.01); *C04B 2235/3206* (2013.01); *C04B 2235/3208* (2013.01); *C04B 2235/3217* (2013.01); *C04B 2235/3418* (2013.01); *C04B 2235/606* (2013.01); *C04B 2235/6567* (2013.01)

(58) Field of Classification Search
CPC ............... C04B 41/4556; C04B 35/10; C04B 35/62655; C04B 35/62695; C04B 35/64; C04B 41/009; C04B 41/4517; C04B 41/5057; C04B 2235/3206; C04B 2235/3208; C04B 2235/3217; C04B 2235/3418; C04B 2235/606; C04B 2235/6567; C04B 35/111; C04B 41/87; B67D 3/0058
See application file for complete search history.

(56) References Cited

U.S. PATENT DOCUMENTS

| 5,381,926 A | 1/1995 | Credle, Jr. et al. |
| 2009/0159612 A1 | 6/2009 | Beavis et al. |

FOREIGN PATENT DOCUMENTS

| JP | 05-294763 A | 11/1993 | |
| JP | 07-017784 A | 1/1995 | |
| JP | H0717784 B2 * | 3/1995 | |
| JP | 07-101771 A | 4/1995 | |
| JP | 07-507527 A | 8/1995 | |
| JP | 09-271303 A | 10/1997 | |
| JP | 2001-213678 A | 8/2001 | |
| JP | 2001213678 A * | 8/2001 | ........... C04B 41/009 |
| JP | 2003-336751 A | 11/2003 | |
| JP | 2012-505370 A | 3/2012 | |

OTHER PUBLICATIONS

Uniformly Carbon-Covered Alumina and Its Surface Characteristics, Lin et al., Langmuir 2005, 21, pp. 5040-5046 (Lin) (Year: 2005).*

* cited by examiner

*Primary Examiner* — Daniel J. Schleis
*Assistant Examiner* — Kevin Ct Li
(74) *Attorney, Agent, or Firm* — Volpe Koenig

(57) ABSTRACT

A corrosion-resistant member according to the present disclosure includes a substrate that is composed of an aluminum-oxide-based ceramic and a covering layer that is composed of an O—Al—C layer that is located on the substrate.

5 Claims, No Drawings

CORROSION-RESISTANT MEMBER

CROSS-REFERENCE TO RELATED APPLICATIONS

This application is a national stage application of International Application No. PCT/JP2018/006736 filed on Feb. 23, 2018, which designates the United States, the entire contents of which are herein incorporated by reference, and which is based upon and claims the benefit of priority to Japanese Patent Application No. 2017-035008 filed on Feb. 27, 2017, the entire contents of which are herein incorporated by reference.

FIELD

The present disclosure relates to a corrosion-resistant member.

BACKGROUND

Demand of a liquid-for-beverage supply apparatus such as a vending machine that pours a beverage such as a juice into a container such as a paper cup to provide it is increased. Herein, an existing concentrated syrup that is an undiluted liquid of a liquid for beverage may have a strongly acidic property such as a pH value of 2 to 3 depending on a kind thereof. Hence, an excellent corrosion resistance against a strongly acidic concentrated syrup is desired for a member such as a valve member and a pump member that is included inside such a liquid-for-beverage supply apparatus. Moreover, as an operation is executed repeatedly, a load is applied thereto, so that an excellent durability is also desired for a member as described above. Hence, Patent Literature 1 describes that a ceramic is used for a member as described above.

CITATION LIST

Patent Literature

Patent Literature 1: Japanese Patent Application Publication No. H07-507527

SUMMARY

A corrosion-resistant member according to the present disclosure includes a substrate that is composed of an aluminum-oxide-based ceramic and a covering layer that is composed of an O—Al—C layer that is located on such a substrate.

DESCRIPTION OF EMBODIMENTS

A long service life is desired for a liquid-for-beverage supply apparatus. Hence, further improvement in a corrosion resistance is desired for a member such as a valve member and a pump member that compose a liquid-for-beverage supply apparatus so that it is possible to execute a use thereof over a long period of time.

Accordingly, a corrosion-resistant member according to the present disclosure has an excellent corrosion resistance. Hereinafter, a corrosion-resistant member according to the present disclosure will be explained in detail.

A corrosion-resistant member according to the present disclosure includes a substrate that is composed of an aluminum-oxide-based ceramic. Herein, an aluminum-oxide-based ceramic is provided in such a manner that aluminum oxide occupies 90% by mass or greater of 100% by mass of all components that compose such an aluminum-oxide-based ceramic. Thus, a substrate is composed of an aluminum-oxide-based ceramic and thereby has a high durability. Moreover, an aluminum-oxide-based ceramic provides an inexpensive raw material price and is readily processed, so that it is possible to manufacture a substrate more inexpensively than another ceramic.

Additionally, it is sufficient that a material of a substrate is identified by a following method. First, a substrate is measured by using an X-ray diffractometer (XRD) and identification thereof is executed from a value of an obtained $2\theta$ (where $2\theta$ is a diffraction angle) by using a JCPDS card. Then, quantitative analysis of a component that is contained in a substrate is executed by using an Inductively Coupled Plasma (ICP) emission spectrophotometer (ICP) or an X-ray fluorescence spectrometer (XRF). Existence of aluminum oxide is confirmed by identification as described above, and if a value provided by converting a content of aluminum (Al) that is measured by an ICP or an XRF into that of aluminum oxide ($Al_2O_3$) is 90% by mass or greater, it is an aluminum-oxide-based ceramic.

Then, a corrosion-resistant member according to the present disclosure further includes a covering layer that is composed of an O—Al—C layer that is located on a substrate. Herein, for alignment of each element in an O—Al—C layer, such alignment is provided in descending order of an average value of an element concentration that is obtained by an X-ray photoemission spectroscopy (XPS). Then, such an O—Al—C layer is excellent in a corrosion resistance as compared with aluminum oxide that is a material of a substrate. Hence, such an O—Al—C layer as a covering layer is located on a substrate that is composed of an aluminum-oxide-based ceramic, so that a component is not readily dissolved even when contacting a strongly acidic concentrated syrup and it has an excellent corrosion resistance. Hence, a corrosion-resistant member according to the present disclosure includes a substrate as described above and a covering layer as described above and has an excellent corrosion resistance, so that it is possible to execute a use thereof over a long period of time.

Herein, although it is sufficient that a part of a surface of a substrate is covered by a covering layer in a corrosion-resistant member according to the present disclosure, a corrosion resistance is further improved if all surfaces of such a substrate are covered by such a covering layer.

Furthermore, it is sufficient that whether or not a covering later that is composed of an O—Al—C layer exists is determined by a following method. First, a surface of a corrosion-resistant member is provided as a measuring surface and such a measuring surface is irradiated with an X-ray (hv) that has a particular energy by using an XPS apparatus (manufactured by PHI, Quantera SXM). Then, in order to investigate an element in a region from a surface of a corrosion-resistant member to a depth of several μm, a process for irradiating a surface with an Ar ion to eliminate it by etching and a process for measuring, in an XPS apparatus, a surface that is newly formed by such etching are repeated alternately. Herein, a kinetic energy ($E_{KIN}$) of a photoelectron that is emitted from a measuring surface is measured to obtain a binding energy ($E_B$) for binding such an photoelectron to an atom ($E_B = h\nu - E_{KIN} - \phi$). Then, a value of a binding energy is inherent in an atom, so that it is possible to know an element that composes a measuring surface through identification of such a value of a binding energy. Furthermore, an intensity of an emitted photoelectron is proportional to a concentration of an element, so that a measurement is executed by an XPS and thereby it is possible to obtain such a concentration of an element.

Then, if oxygen (O), aluminum (Al), and carbon (C) are simultaneously identified in a direction from a surface of a corrosion-resistant member toward an interior thereof as a result of such a measurement, it is assumed that a covering layer that is composed of an O—Al—C layer is included. Herein, it is assumed that a thickness of a covering layer is provided as a depth from a surface of a corrosion-resistant member where carbon is not detected thereat.

Furthermore, an element concentration of carbon on a surface of a covering layer in a corrosion-resistant member according to the present disclosure may be 25 atomic % or greater and 55 atomic % or less. If such a configuration is satisfied, a crack is not readily generated on a surface of a covering layer, so that a corrosion resistance of such a covering layer that contacts a strongly acidic concentrated syrup is further improved while a durability thereof is maintained. Additionally, if an element concentration of oxygen on a surface of a covering layer is 24 atomic % or greater and 48 atomic % or less or an element concentration of aluminum thereon is 21 atomic % or greater and 46 atomic % or less, a corrosion resistance of such a covering layer is further improved.

Furthermore, a thickness of a covering layer in a corrosion-resistant member according to the present disclosure may be 10 nm or greater and 100 nm or less. If such a configuration is satisfied, a corrosion resistance of a corrosion-resistant member according to the present disclosure is improved while a durability thereof is maintained.

Furthermore, a ratio A/B of a covering layer in a corrosion-resistant member according to the present disclosure may be 5 or greater where A is an element concentration of carbon on a surface of such a covering layer and B is an element concentration of carbon at a depth of 6 nm from a surface of such a covering layer toward a side of a substrate. If such a configuration is satisfied, a corrosion resistance of a corrosion-resistant member according to the present disclosure is improved.

Furthermore, a ratio B/C of a covering layer in a corrosion-resistant member according to the present disclosure may be 2 or less where B is described above and C is an element concentration of carbon at a depth of 10 nm from a surface of such a covering layer toward a side of a substrate. If such a configuration is satisfied, a corrosion resistance of a corrosion-resistant member according to the present disclosure is further improved.

Furthermore, a substrate in a corrosion-resistant member according to the present disclosure may contain a total of 0.02% by mass or greater and 0.2% by mass or less of a minor constituent(s) such as iron oxide ($Fe_2O_3$), zirconium oxide ($ZrO_2$), titanium oxide ($TiO_2$), chromium oxide ($Cr_2O_3$), and/or yttrium oxide ($Y_2O_3$), other than aluminum oxide, among 100% by mass of all components that compose such a substrate.

Next, an example of a manufacturing method for a corrosion-resistant member according to the present disclosure will be explained.

First, a sintering aid, a binder, a solvent, a dispersant, and the like are appropriately added and mixed into an aluminum oxide powder to fabricate a slurry. Then, such a slurry is spray-dried by a spray drying granulation method (a spray drying method) to execute granulation thereof and thereby fabricate a granule, and an obtained granule is molded into a desired shape by a powder press molding method or the like to obtain a molded body.

Then, a molded body is dried and degreased to fabricate a degreased body, and subsequently, held and fired in an atmospheric air atmosphere at a maximum temperature of 1500 to 1600° C. for 2 to 12 hours to obtain a substrate that is composed of an aluminum-oxide-based ceramic.

Then, such a substrate is put into a container that is made of a carbon (a carbon element) and held and treated with heat in a nitrogen gas atmosphere at a maximum temperature of 800 to 950° C. for 0.25 hours or longer. Subsequently, cooling to a room temperature is executed in a nitrogen gas atmosphere. Thereby, a covering layer that is composed of an O—Al—C layer is formed on a surface of a substrate to obtain a corrosion-resistant member according to the present disclosure. Additionally, it is sufficient that a mask with an arbitrary shape is formed on a surface of a substrate and subsequently a heat treatment as described above is executed, in order to cause a covering layer to exist on only a part of a surface of such a substrate.

Herein, it is sufficient that a maximum temperature in a heat treatment as described above is 820 to 930° C., in order to cause an element concentration of carbon on a surface of a covering layer to be 25 atomic % or greater and 55 atomic % or less.

Furthermore, it is sufficient that a holding time in a heat treatment as described above is 0.5 hours or longer and 3 hours or shorter, in order to cause a thickness of a covering layer to be 10 nm or greater and 100 nm or less.

Furthermore, a heat treatment as described above is divided into two stages and adjusted appropriately in a following condition, so that it is possible to cause an element concentration A of carbon on a surface of a covering layer, an element concentration B of carbon at a depth of 6 nm from a surface of such a covering layer toward a side of a substrate, and/or an element concentration C of carbon at a depth of 10 nm from a surface of such a covering layer toward a side of such a substrate to be an arbitrary value(s). Specifically, it is sufficient that, first, a heat treatment at a first stage is executed by holding a maximum temperature of 800 to 850° C. for 0.25 hours or longer, and subsequently, a heat treatment at a second stage is executed by holding a maximum temperature of 900 to 950° C. for 0.25 hours or longer.

Hereinafter, although a practical example(s) according to the present disclosure will be explained specifically, the present disclosure is not limited to such a practical example (s).

Practical Example 1

Samples with presence or absence of a covering layer that was composed of an O—Al—C layer and an element concentration A of carbon on a surface of the covering layer that were different were fabricated and a corrosion resistance and a durability were evaluated.

First, 0.3 parts by mass of a calcium carbonate powder in an equivalent of calcium oxide (CaO), 0.6 parts by mass of a magnesium carbonate powder in an equivalent of magnesium oxide (MgO), and 0.3 parts by mass of a silicon oxide powder as sintering aids were added to 100 parts by mass of an aluminum oxide powder that was a main component to obtain a prepared powder.

Then, 100 parts by mass of a solvent and 0.2 parts by mass of a dispersant were added and mixed into 100 parts by mass of such a prepared powder to fabricate a slurry.

Then, such a slurry was spray-dried by a spray drying method to execute granulation thereof and thereby fabricate granules and obtained granules were molded into each of a cylindrical molded body A (with an outer diameter of 16 mm, an inner diameter of 10 mm, and a length of 13 mm) and an annular molded body B (with an outer diameter of 16 mm, an inner diameter of 10 mm, and a thickness of 3 mm) by a powder press molding method.

Then, the molded bodies A and B were dried and degreased to fabricate degreased bodies and subsequently holding and firing thereof were executed in an atmospheric air atmosphere at a maximum temperature of 1550° C. for 5 hours to obtain substrates A and B that were composed of an aluminum-oxide-based ceramic. Additionally, dimensions of such a substrate A were an outer diameter of 13 mm, an inner diameter of 8 mm, and a length of 10 mm and dimensions of the substrate B were an outer diameter of 13 mm, an inner diameter of 8 mm, and a length of 2 mm.

Then, such substrates A and B were put into a container that was made of carbon and a heat treatment was executed in a nitrogen gas atmosphere on a condition as illustrated in Table 1. Subsequently, cooling to a room temperature was executed in a nitrogen gas atmosphere. Thereby, sample Nos. 2 to 14 were obtained. Additionally, such a heat treatment was not executed for sample No. 1.

Then, whether or not a covering layer that was composed of an O—Al—C layer existed was determined for sample Nos. 1 to 14 by a following method. First, a surface of each sample was provided as a measuring surface, and the measuring surface was irradiated with an X-ray (hv) that had a particular energy by using an XPS apparatus (made by PHI INCORPORATED, Quantera SXM). Then, in order to investigate an element in a region from a surface of each sample to a depth of 2 μm, a process for irradiating the surface with an Ar ion to eliminate it by etching and a process for measuring, by an XPS apparatus, a surface that was newly formed by the etching were repeated alternately. Then, a kinetic energy (EKIN) of a photoelectron that was emitted from the measuring surface was measured to obtain a binding energy (EB) for binding such a photoelectron in an atom (EB=hv−EKIN−ϕ). As a result, only oxygen and aluminum were identified for sample No. 1 and it was found that it did not have a covering layer that was composed of an O—Al—C layer. On the other hand, oxygen, aluminum, and carbon are simultaneously identified for sample Nos. 2 to 14 and it was found that it had a covering layer that was composed of an O—Al—C layer.

Furthermore, an intensity of an emitted photoelectron was proportional to an element concentration, so that a measurement was executed by an XPS and thereby an element concentration A of carbon on a surface of a covering layer for sample Nos. 2 to 14 was obtained.

Then, a durability test for a substrate B of each sample was executed by a following method. First, each sample was mounted on a plate that was made of a metal in such a manner that circumferential surfaces of respective annular samples contact them. Then, a pressure was applied to each sample from above and a pressure (N) to cause each sample to be broken was measured to provide it as a strength (N) of each sample.

Furthermore, a corrosion resistance test for a substrate A of each sample was executed by a following method. First, each sample was dipped in a syrup of a carbonated beverage (a stock solution: pH 2.2, a solution volume: 100 ml) for 72 hours and its masses before and after dipping were measured to calculate its reduced mass after dipping. Specifically, a reduced mass after dipping (%) was calculated in accordance with $\{(W2-W1)/W1\} \times 100(\%)$ where W1 was a mass of a sample before dipping and W2 was a mass of a sample after dipping.

Results are illustrated in Table 1. Additionally, if a reduced mass after dipping (%) in Table 1 is minus, it indicates that a mass was reduced.

TABLE 1

| Sample No. | Heat Treatment Conditions | | Covering Layer that was composed of O—Al—C Layer | | Strength (N) | Reduced Mass (%) |
| | Maximum Temperature (° C.) | Holding Time (h) | Presence or Absence | Element Concentration A of Carbon on Surface (atomic %) | Thickness of Covering Layer (nm) | | |
| --- | --- | --- | --- | --- | --- | --- | --- |
| 1 | — | — | Absence | — | — | 240 | −0.049 |
| 2 | 800 | 0.25 | Presence | 16 | 2 | 218 | −0.038 |
| 3 | 800 | 4 | Presence | 16 | 106 | 208 | −0.038 |
| 4 | 820 | 0.25 | Presence | 25 | 3 | 219 | −0.027 |
| 5 | 820 | 0.5 | Presence | 25 | 10 | 217 | −0.021 |
| 6 | 820 | 3 | Presence | 25 | 100 | 210 | −0.021 |
| 7 | 820 | 4 | Presence | 25 | 115 | 206 | −0.021 |
| 8 | 870 | 2 | Presence | 40 | 41 | 214 | −0.02 |
| 9 | 930 | 0.25 | Presence | 55 | 8 | 218 | −0.025 |
| 10 | 930 | 0.5 | Presence | 55 | 13 | 217 | −0.02 |
| 11 | 930 | 3 | Presence | 55 | 100 | 210 | −0.02 |
| 12 | 930 | 4 | Presence | 55 | 128 | 200 | −0.02 |
| 13 | 950 | 0.25 | Presence | 68 | 9 | 195 | −0.023 |
| 14 | 950 | 4 | Presence | 68 | 132 | 190 | −0.02 |

As illustrated in Table 1, whereas a reduced mass after dipping for sample No. 1 was −0.049%, a reduced mass after dipping for sample Nos. 2 to 14 was −0.038% or greater, so that it was found that a covering layer that was composed of an O—Al—C layer was included and thereby was excellent in a corrosion resistance.

Moreover, for sample Nos. 4 to 12 where an element concentration of carbon on a surface of a covering layer was 25 atomic % or greater and 55 atomic % or less, among sample Nos. 2 to 14, a strength was 200 N or greater and a reduced mass after dipping was −0.027% or greater, so that it was found that a corrosion resistance was further improved while a durability was maintained.

Moreover, for sample Nos. 5, 6, 8, 10, and 11 where a thickness of a covering layer was 10 nm or greater and 100 nm or less, among sample Nos. 4 to 12, a strength was 210 N or greater and a reduced mass after dipping was −0.021% or greater, so that it was found that a corrosion resistance was further improved while a durability was maintained.

Practical Example 2

Then, samples where an element concentration A of carbon on a surface of a covering layer, an element concentration B of carbon at a depth of 6 nm from a surface of the covering layer toward a side of a substrate, and an element concentration C of carbon at a depth of 10 nm from a surface of the covering layer toward a side of the substrate were different were fabricated and a corrosion resistance was evaluated.

Additionally, a fabrication method for sample Nos. 16 to 20 was similar to a fabrication method for Practical Example 1 except that a two-stage heat treatment was executed for a heat treatment. Specifically, a heat treatment at a first stage was executed by holding a maximum temperature of 800 to 850° C. for 1 hour or longer and 2.5 hours or shorter and subsequently a heat treatment at a second stage was executed by holding a maximum temperature of 900 to 950° C. for 0.5 hours or longer and 2 hours or shorter, so that each of element concentrations A, B, and C of carbon as illustrated in Table 2 was provided. Additionally, a total of holding times at the first stage and the second stage was 3 hours and a thickness of a covering layer for sample Nos. 16 to 20 was 41 nm. Furthermore, Table 2 illustrates sample No. in Practical Example 1 as sample No. 15 for a comparative example.

Then, a measurement method that was similar to that of Practical Example 1 was executed for each sample, in order to measure, for each sample, an element concentration A of carbon on a surface of a covering layer, an element concentration B of carbon at a depth of 6 nm from a surface of the covering layer toward a side of a substrate, and an element concentration C of carbon at a depth of 10 nm from a surface of the covering layer toward a side of the substrate.

Furthermore, a durability test for each sample was executed similarly to that of Practical Example 1. Results are illustrated in Table 2. Additionally, in Table 2, each of A/B and B/C is illustrated by rounding off it to one or more decimal places.

TABLE 2

| Sample No. | Element Concentration of Carbon | | | A/B | B/C | Strength (N) |
| --- | --- | --- | --- | --- | --- | --- |
| | A (atomic %) | B (atomic %) | C (atomic %) | | | |
| 15 | 40 | 9 | 4 | 4.4 | 2.3 | 207 |
| 16 | 40 | 4 | 5 | 10.0 | 0.8 | 227 |
| 17 | 40 | 6 | 5 | 6.7 | 1.2 | 226 |
| 18 | 40 | 7 | 6 | 5.7 | 1.2 | 226 |
| 19 | 40 | 8 | 4 | 5.0 | 2.0 | 225 |
| 20 | 40 | 7 | 3 | 5.7 | 2.3 | 215 |

As illustrated in Table 2, a strength for sample Nos. 16 to 20 was 215 N or greater, so that it was found that a ratio A/B of element concentrations of carbon was 5 or greater and thereby a durability was improved.

Furthermore, a strength for sample Nos. 16 to 19, among sample Nos. 16 to 20, was 225 N or greater, so that it was found that a ratio B/C of element concentrations of carbon was 2 or less and thereby a durability was further improved.

An additional effect or variation can readily be derived by a person(s) skilled in the art. Hence, a broader aspect(s) of the present invention is/are not limited to a specific detail(s) and a representative embodiment(s) as illustrated and described above. Therefore, various modifications are possible without departing from the spirit or scope of a general inventive concept that is defined by the appended claim(s) and an equivalent(s) thereof.

The invention claimed is:

1. A corrosion-resistant member, comprising:
   a substrate that is composed of an aluminum-oxide-based ceramic; and
   a covering layer that is composed of an O—Al—C layer that is located on the substrate,
   wherein the aluminum-oxide-based ceramic includes at least 90% by mass of aluminum oxide.

2. The corrosion-resistance member according to claim 1, wherein an element concentration of carbon on a surface of the covering layer is 25 atomic % or greater and 55 atomic % or less.

3. The corrosion-resistance member according to claim 1, wherein a thickness of the covering layer is 10 nm or greater and 100 nm or less.

4. The corrosion-resistance member according to claim 1, wherein a ratio A/B of the covering layer is 5 or greater in a case where A is an element concentration of carbon on a surface of the covering layer and B is an element concentration of carbon at a depth of 6 nm from the surface of the covering layer toward a side of the substrate in a perpendicular direction to the surface of the covering layer.

5. The corrosion-resistance member according to claim 1, wherein a ratio B/C of the covering layer is 2 or less in a case where B is an element concentration of carbon at a depth of 6 nm from a surface of the covering layer toward a side of the substrate and C is an element concentration of carbon at a depth of 10 nm from the surface of the covering layer toward a side of the substrate in a perpendicular direction to the surface of the covering layer.

* * * * *